United States Patent Office 3,335,623
Patented Aug. 15, 1967

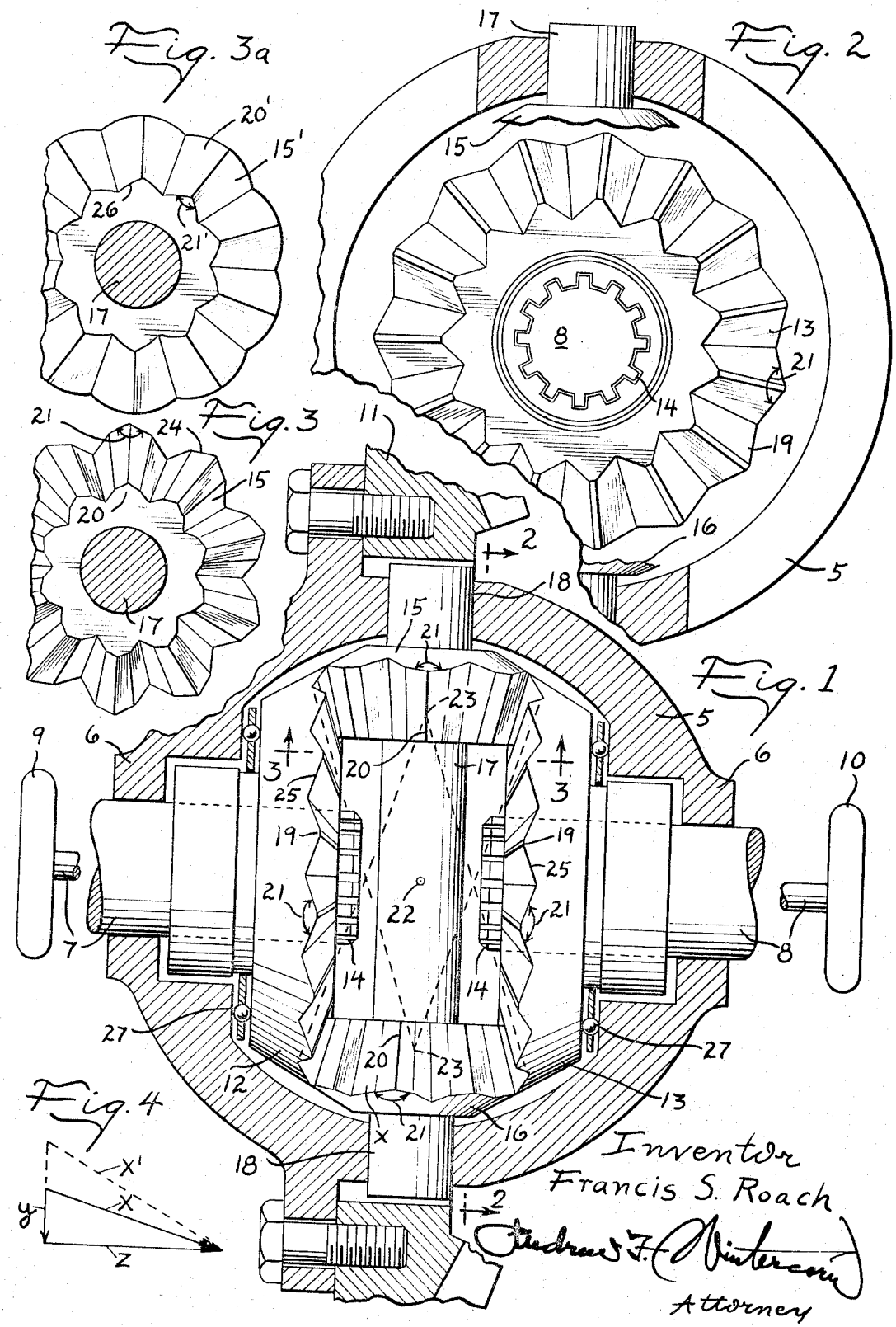

3,335,623
POSITIVE DRIVE DIFFERENTIAL
Francis S. Roach, 628 W. Lincoln Blvd.,
Freeport, Ill. 61032
Filed May 13, 1965, Ser. No. 455,566
4 Claims. (Cl. 74—711)

ABSTRACT OF THE DISCLOSURE

A positive drive differential wherein the teeth of opposed differential pinions are of generally triangular shape in cross-section with their apex angle in the range of 130° to 150° and wherein the teeth of each pinion have a focal point located approximately in the opposed pinion, thereby providing a releaseable lockup action to prevent wheel spinning.

---

This invention relates to a new and improved positive drive differential.

I am aware that there have been numerous positive drive differentials proposed, but most of them have not been practical for one reason or another or have been too expensive to be commercially feasible, with the result that only a few have actually been adopted and used commercially, and then only in relatively small numbers. It is, therefore, the principal object of my invention to provide a positive drive differential of simpler and more practical construction avoiding the objections that have inevitably been raised to these prior constructions and which have militated against their adoption and use commercially.

In the positive drive differential of my invention I employ what I prefer to call clutch gears and pinions as distinguished from ordinary gears and pinions, inasmuch as they function for clutch purposes in addition to transmitting rotation from one part to another, the clutch action enabling driving both driven wheels of a vehicle in unison except when turning a corner when one wheel is allowed to turn relative to the other to the extent necessary but the clutch action prohibits one wheel spinning while having little or no traction and taking all or nearly all of the drive while the other wheel that has traction does not turn and receives little or no drive.

The salient feature of my differential is the novel generally triangular shape of the teeth on the driven axle clutch gears and of the meshing teeth on the intermediate driving clutch pinions, whereby due to the angle of inclination of the outer peripheral portions of the teeth on the clutch pinion matching the angle of the teeth on the clutch gears a wedging action occurs to prevent a free wheel spin, thereby insuring positive drive, and yet, due to the rounded inner portion of the teeth on the clutch pinions, the clutch pinions will roll smoothly on the clutch gears as required in turning a corner.

The invention as illustrated in the accompanying drawing, in which:

FIG. 1 is an axial section through a differential case of conventional design showing therein in elevation the novel clutch gears and pinions of my invention and illustrating more or less diagrammatically the connection of the two driven axle sections with the two driven wheels, which are shown on a much smaller scale;

FIG. 2 is a cross-section on the line 2—2 of FIG. 1 to better illustrate the novel generally triangular shape of the teeth of the driven axle clutch gears, one of which appears in front elevation in this section;

FIG. 3 is a section on the line 3—3 of FIG. 1 showing one of the intermediate clutch pinions in face view to better illustrate the shape of the teeth thereof;

FIG. 3a is a view similar to FIG. 3 showing a modified or alternative form of intermediate clutch pinion with slightly different teeth; and FIG. 4 is a force diagram illustrating the novel operation of the present differential.

Similar reference numerals are applied to corresponding parts throughout these views.

Referring to the drawing, the reference numeral 5 designates a conventional design of differential spider case having bearings 6 in the opposite sides into which are extended the ends 7 and 8 of the two axle sections connected with the two driven wheels 9 and 10, respectively, the case 5 being driven by means of the usual ring gear 11 to transmit drive to the wheels 9 and 10 through whatever differential gearing is provided in the case 5, and the case being enclosed within the usual differential housing filled with lubricant to a predetermined level, in the usual way.

In lieu of the usual conventional differential gearing consisting of ordinary bevelled gears and pinions I provide, in accordance with my invention, driven axle clutch gears 12 and 13, splined as indicated at 14 on the two axle sections 7 and 8, respectively, and meshing at diametrically opposite points thereof with intermediate driving clutch pinions 15 and 16 mounted in opposed relationship inside case 5 on opposite ends of a cross-shaft 17 entered in diametrically opposed holes 18 provided in the case 5. Various features of these clutch gears and clutch pinions that are novel will be enumerated, as follows:

(1) They differ from ordinary gears and pinions inasmuch as they function for clutch purposes in addition to transmitting rotation from one part to another, the clutch action enabling driving both driven wheels 9 and 10 of a vehicle in unison, except when turning a corner, when one wheel is allowed to turn relative to the other to the extent necessary, but the clutch action prohibits either wheel spinning while it has little or no traction and takes all or nearly all of the drive while the other wheel that may have traction does not turn and receives little or no drive;

(2) The generally triangular shape of the teeth 19 on the driven axle clutch gears 12–13 and of the meshing teeth 20 on the drive clutch pinions 15 and 16 is an important feature, the included angle at the apex of each tooth 19 and each tooth 20 being about 140° as indicated at 21 in FIG. 1;

(3) Whereas, in the conventional differential gearing all of the teeth on the driving pinions and driven gears have a focal point at 22 at the center of the case 5, the focal points for the present driving clutch pinions and driven clutch gears are at the two points numbered 23, within the two pinions 15 and 16, as indicated by the dotted converging lines in FIG. 1.

(4) The driving clutch pinions 15 and 16 have teeth 20 the sides of which are steep, as is obvious from the focal points 23, and these teeth are also beveled at the tip, as at 24, to match the small angle of inclination (about 20°) of the sides 25 of the teeth 19 on the driven clutch gears 12 and 13 to give more drag and friction and provide a bit more positive lock-up than would be possible if the teeth were like those shown at 20′ on the pinion 15′ in FIG. 3a, where the sides of each tooth are rounded or convex, as indicated at 26, that form of tooth giving a freer rolling action on the teeth 19 of the gears 12 and 13, and a lock-up action that is not quite as positive. The teeth 26 are, however, otherwise much the same as teeth 20 insofar as the generally triangular shape of the teeth is concerned, the angle on opposite sides of the tips of the teeth is smaller, being about 15°. At 27 are indicated anti-friction thrust washers on both sides of the assembly.

The operation of my improved positive drive differential can probably best be described by referring to the force diagram of FIG. 4 wherein the line $x$ represents the power applied from the motor through a transmission to the drive shaft and the pinion on the rear end thereof which meshes with and drives the ring gear 11 attached to the gear case 5, this power being thereby transmitted through pinions 15 and 16 to the gears 12 and 13 and thence to the rear axle section 7 and 8 to drive the wheels 9 and 10. The line $x$ is at right angles to one side of the V shown in dotted lines terminating at the focal point 23, and, with such a small angle, the components are what are shown at $y$ and $z$ in FIG. 4, as distinguished from the greatly increased component $y$ when the angle of line $x$ is increased to the extent indicated in dotted lines at $x'$, which is approximately the condition in the conventional differential where the pinions 15 and 16 have the focal point at the center of the gear case, marked 22, and the usual pinion gears and other gears of the conventional differential are used. In the conventional differential, when one wheel happens to be on a slippery surface and the other wheel has good traction, the power flows to the wheel having the least traction, driving the free wheel and giving little or no drive to the other wheel. In my improved differential, due to the small component $y$ shown in full lines in FIG. 4, as compared with a much larger component (nearly double) in the conventional differential, there is not sufficient force in a rotational direction to spin either wheel independently. Otherwise, the present differential operates in much the same way as the conventional differential, insofar as turning corners is concerned, where, of course, one wheel must turn faster than the power applied would cause it to turn on a straightaway, while the other must turn slower than the power supplied would cause it to turn on a straightaway, all other results being, however, different, because the angle of inclination of the sides 25 of teeth on gears 12 and 13, and the corresponding inclination on the sides 24 of the tips of the teeth 20 of pinions 15 and 15, a lockup action is obtained that prevents spinning of one wheel, the degree of lockup, however, being moderated by selection of angles sufficiently short of too positive lockup, so as to obtain fairly smooth and quiet operation, and as much durability as with other differentials. In my opinion a 20° angle of inclination of the sides 25 of the teeth 19 (with corresponding inclination of the sides 24 of the tips of teeth 20), making the included angle 21 approximately 140°, gives the best results. Increasing this angle 21 to the point where the angle is approximately 150°, making the sides 25 approximately 15° is not at all satisfactory becaue of the solid lock-up that is produced with that angulation. On the other hand, the angle 21 may be as small as 130°, making the angles of the sides 24 and 25 approximately 25°, and I have found that a differential with such angulation operates quite satisfactorily. An intermediate angulation that I have found satisfactory is an included angle at 21 of approximately 135° with the sides 24 and 25 at approximately 22½°.

That gives a greater locking action than where the angle of the sides is about 25°, but there is still free enough release in turning corners. Standard type thrust washers may be used at 27. In conclusion, I would add that by substituting the pinions 15' of FIG. 3a gives less drag and friction on the teeth and makes the lock-up a bit less positive, so, of course, the angle at 21 can be increased a little over what could be used satisfactorily with pinions like that shown at 15 in FIG. 3.

It is believed the foregoing description conveys a good understanding of the objects and advantages of my invention. The appended claims have been drawn to cover all legitimate modifications and adaptations.

I claim:

1. In a differential comprising the usual combination and arrangement of a driven ring gear, a housing fixed to and turning with the ring gear, coaxially spaced opposed axle drive gears in said housing on the same axis with said ring gear for transmitting drive to the inner ends of coaxially opposed axle sections to drive wheels fixed to their outer ends, and coaxially opposed pinions meshing with said opposed gears and mounted in said housing on an axis at right angles to the first named axis to transmit drive differentially to said axle drive gears, the improvement which consists in said pinions having teeth whose focal point for each pinion is approximately in the other pinion, and said axle drive gears having teeth of complementary form, whereby to reduce the rotational component to a small fraction of what would be obtained with teeth whose focal point is approximately at the center of the differential approximately midway between said pinions and thereby reduce likelihood of either wheel being spun, the teeth of said pinions and said axle drive gears being generally triangular shaped in cross-section with their apex angle in the range of approximately 130° to 150° for a releaseable lockup action to prevent spinning of either wheel.

2. A differential as set forth in claim 1 wherein the teeth on the pinions while otherwise of generally triangular shape in cross-section have only their tip portions bevelled to the apex angle specified resulting in a generally pentagonal shape in cross-section.

3. A differential as set forth in claim 1 wherein the teeth on the pinions, which are of generally triangular cross-section, have convex sides for a freer rolling action and less positive lockup action.

4. The combination set forth in claim 1 including antifriction thrust bearing means between the housing and the axle drive gears.

References Cited

UNITED STATES PATENTS

| 2,392,441 | 1/1946 | Wildhaber | 74—711 |
| 3,216,282 | 11/1965 | Randall | 74—711 |

FRED C. MATTEN, JR., *Primary Examiner.*

DAVID J. WILLIAMOWSKY, *Examiner.*

J. A. WONG, *Assistant Examiner.*